(12) United States Patent
Zhou

(10) Patent No.: US 11,388,459 B2
(45) Date of Patent: Jul. 12, 2022

(54) METHOD AND APPARATUS FOR DETERMINING BANDWIDTH, AND ELECTRONIC DEVICE AND STORAGE MEDIUM

(71) Applicant: Beijing Dajia Internet Information Technology Co., Ltd., Beijing (CN)

(72) Inventor: Chao Zhou, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 0 days.

(21) Appl. No.: 17/570,042

(22) Filed: Jan. 6, 2022

(65) Prior Publication Data
US 2022/0132190 A1    Apr. 28, 2022

Related U.S. Application Data

(63) Continuation of application No. PCT/CN2020/125917, filed on Nov. 2, 2020.

(30) Foreign Application Priority Data

Mar. 31, 2020   (CN) .......................... 202010247247.9

(51) Int. Cl.
*H04N 21/24*   (2011.01)
*H04N 21/2385*   (2011.01)
(Continued)

(52) U.S. Cl.
CPC ....... *H04N 21/2402* (2013.01); *H04L 41/147* (2013.01); *H04L 43/0894* (2013.01); *H04N 21/2385* (2013.01)

(58) Field of Classification Search
CPC .............. H04N 21/2402; H04L 41/147; H04L 43/0894
See application file for complete search history.

(56) References Cited

U.S. PATENT DOCUMENTS

7,543,326 B2   6/2009 Moni
2004/0103150 A1*  5/2004 Ogdon ........... H04N 21/440227
                                                348/E7.083
(Continued)

FOREIGN PATENT DOCUMENTS

CN   101667407 A   3/2010
CN   101676890 A   3/2010
(Continued)

OTHER PUBLICATIONS

English translation of Second Office Action issued in CN202010247247.9, dated May 12, 2021.
(Continued)

*Primary Examiner* — Robert J Hance
(74) *Attorney, Agent, or Firm* — Meunier Carlin & Curfman LLC

(57) ABSTRACT

The present disclosure relates to a method and apparatus for determining bandwidth, and an electronic device and a storage medium. The method includes: determining whether there is historical bandwidth information in a first time window; determining whether there is historical bandwidth information in at least one second time window in response to determining that there is no historical bandwidth information in the first time window; and calculating target bandwidth information according to the historical bandwidth information in response to determining that there is the historical bandwidth information in the second time window, wherein the second time window covers the first time window.

12 Claims, 5 Drawing Sheets

(51) Int. Cl.
*H04L 41/147* (2022.01)
*H04L 43/0894* (2022.01)

(56) References Cited

U.S. PATENT DOCUMENTS

| | | | | |
|---|---|---|---|---|
| 2008/0101227 | A1* | 5/2008 | Fujita | H04L 45/50 370/232 |
| 2008/0273591 | A1* | 11/2008 | Brooks | H04N 21/6373 375/240.01 |
| 2009/0232200 | A1* | 9/2009 | Henocq | H04N 21/2402 375/E7.026 |
| 2010/0295862 | A1 | 11/2010 | Ai | |
| 2012/0141089 | A1* | 6/2012 | Hunt | H04N 21/6373 386/239 |
| 2012/0195388 | A1* | 8/2012 | Oike | H04N 19/172 375/259 |
| 2013/0216212 | A1 | 8/2013 | Hurst | |
| 2014/0075030 | A1* | 3/2014 | Wang | H04L 41/30 709/226 |
| 2014/0258463 | A1* | 9/2014 | Winterrowd | H04L 65/4084 709/219 |
| 2015/0113159 | A1* | 4/2015 | Gogoi | H04L 67/02 709/231 |
| 2015/0201226 | A1* | 7/2015 | Hunt | H04N 21/6373 725/96 |
| 2015/0326481 | A1* | 11/2015 | Rector | H04L 47/2416 370/236 |
| 2018/0139258 | A1* | 5/2018 | Margolin | H04N 21/64738 |
| 2019/0166643 | A1* | 5/2019 | Petria | H04W 24/08 |
| 2019/0254057 | A1 | 8/2019 | Hampel et al. | |
| 2021/0083947 | A1 | 3/2021 | Yang | |

FOREIGN PATENT DOCUMENTS

| | | | |
|---|---|---|---|
| CN | 102624634 A | 8/2012 | |
| CN | 103281569 A | 9/2013 | |
| CN | 104735786 A | 6/2015 | |
| CN | 104780124 A | 7/2015 | |
| CN | 106357559 A | 1/2017 | |
| CN | 106656662 A | 5/2017 | |
| CN | 106658072 A | 5/2017 | |
| CN | 109450672 A | 3/2019 | |
| CN | 109698797 A | 4/2019 | |
| CN | 110049357 A | 7/2019 | |
| CN | 110087110 A | 8/2019 | |
| CN | 110351123 A | 10/2019 | |
| CN | 110474815 A | 11/2019 | |
| CN | 110662093 A | 1/2020 | |
| CN | 111405319 A | 7/2020 | |
| WO | WO-02087276 A2 * | 10/2002 | H04L 12/2697 |
| WO | WO-2012079236 A1 * | 6/2012 | H04L 47/38 |

OTHER PUBLICATIONS

International Search Report issued in PCT/CN2020/125917, dated Jan. 27, 2021.
English Translation of Notification of Intention to Grant issued in CN202010247247.9, dated Jun. 24, 2021.

* cited by examiner

METHOD AND APPARATUS FOR DETERMINING BANDWIDTH, AND ELECTRONIC DEVICE AND STORAGE MEDIUM

This application is a continuation of International Application No. PCT/CN2020/125917, filed on Nov. 2, 2020, which claims priority to Chinese Patent Application No. 202010247247.9, filed on Mar. 31, 2020, in the China National Intellectual Property Administration, and entitled "Bandwidth Determination Method and Apparatus, and Electronic Device and Storage Medium", the disclosures of which are herein incorporated by reference in their entireties.

FIELD

The present disclosure relates to the field of video technology, and particularly to a method and apparatus for determining bandwidth, an electronic device and a storage medium.

BACKGROUND

With the development of short video services, a large number of short videos occupy the people's online time and network traffic. For users, the stutter problem and the video definition when watching short videos may greatly affect the usage experience. In order to adapt to various network conditions, the multi-rate adaptive technology is proposed in the related technologies.

Based on the multi-rate adaptive technology, when a user watches a video through an electronic device such as a terminal, a video player application may select an appropriate code rate for a video dynamically based on historical bandwidth information of the terminal, to find the best compromise proposal between the playing stutter and the video definition.

SUMMARY

The present disclosure provides a method and apparatus for determining bandwidth, an electronic device and a storage medium, to at least solve the technical problem of low accuracy in determining the bandwidth information in related technologies. The technical solutions of the present disclosure are as follows.

According to a first aspect of embodiments of the present disclosure, a method for determining bandwidth applicable to a video player application is provided, where the video player application is applicable to a terminal, and the method includes: determining whether there is historical bandwidth information in a first time window, where the historical bandwidth information is bandwidth information when data is transmitted through a network in the first time window; determining whether there is historical bandwidth information in at least one second time window in response to determining that there is no historical bandwidth information in the first time window, where a time interval of the second time window includes a time interval of the first time window, and the time interval of the second window is larger than the time interval of the first time window; calculating target bandwidth information according to the historical bandwidth information in response to determining that there is the historical bandwidth information in the second time window.

According to a second aspect of embodiments of the present disclosure, an apparatus for determining bandwidth applicable to a video player application is provided, where the video player application is applicable to a terminal, and the apparatus includes: a first determination module configured to determine whether there is historical bandwidth information in a first time window, where the historical bandwidth information is bandwidth information when data is transmitted through a network in the first time window; a second determination module configured to determine whether there is historical bandwidth information in at least one second time window in response to determining that there is no historical bandwidth information in the first time window, where a time interval of the second time window includes a time interval of the first time window, and the time interval of the second window is larger than the time interval of the first time window; a bandwidth calculation module configured to calculate target bandwidth information according to the historical bandwidth information in response to determining that there is the historical bandwidth information in the second time window.

According to a third aspect of embodiments of the present disclosure, an electronic device is provided, the electronic device including: a processor; a memory for storing instructions executable by the processor; where the processor is configured to execute the instructions to: determine whether there is historical bandwidth information in a first time window, where the historical bandwidth information is bandwidth information when data is transmitted through a network in the first time window; determine whether there is historical bandwidth information in at least one second time window in response to determining that there is no historical bandwidth information in the first time window, where a time interval of the second time window includes a time interval of the first time window, and the time interval of the second window is larger than the time interval of the first time window; calculate target bandwidth information according to the historical bandwidth information in response to determining that there is the historical bandwidth information in the second time window.

According to a fourth aspect of embodiments of the present disclosure, a storage medium is provided. When instructions in the storage medium are executed by a processor of an electronic device, the electronic device can perform the method for determining bandwidth described in any one of the foregoing embodiments.

According to a fifth aspect of embodiments of the present disclosure, a computer program product is provided, where the computer program product is configured to, when invoked by a computer for execution, cause the computer to perform the method for determining bandwidth described in any one of the foregoing embodiments.

Technical solutions provided by embodiments of the present disclosure at least bring following beneficial effects.

In embodiments of the present disclosure, the historical bandwidth information is determined in the shorter first time window at first, the historical bandwidth information is determined in at least one longer second time window in the case when there is no historical bandwidth information in the first time window, and the target bandwidth information is calculated based on the determined historical bandwidth information. Thus, if the historical bandwidth information has been determined in the shorter first time window, the historical bandwidth information is closer to a preset moment in the future, thereby ensuring the accuracy of the bandwidth information at the preset moment determined according to the historical bandwidth information; if no historical bandwidth information is determined in the shorter first time window, the historical bandwidth information may be determined in the longer second time window, so as to determine the historical bandwidth information.

It should be understood that the above general description and the following detailed description are only exemplary and illustrative, and cannot limit the disclosure.

BRIEF DESCRIPTION OF THE DRAWINGS

The accompanying drawings here are incorporated into and constitute a part of the specification, illustrate embodiments conforming to the present disclosure, and together with the specification, serve to explain principles of the disclosure, but not constitute an improper limitation on the disclosure.

DETAILED DESCRIPTION OF EMBODIMENTS

In order to enable those ordinary skilled in the art to better understand technical solutions of the disclosure, the technical solutions in embodiments of the present disclosure will be described clearly and completely with reference to the accompanying drawings.

It should be noted that the terms such as "first", "second" and the like in the specification and claims of the present disclosure and the above drawings are used to distinguish similar objects, but not necessarily to describe a particular order or sequence. It should be understood that the data used in this way is interchangeable under appropriate circumstances, so that embodiments of the present disclosure described herein can be implemented in an order other than those illustrated or described herein. The implementations described in the following embodiments do not represent all the implementations consistent with the disclosure. On the contrary, they are only examples of devices and methods which are detailed in the attached claims and consistent with some aspects of the disclosure.

The inventor found that a user does not necessarily watch different short videos continuously when he watches short videos. Since each short video is relatively independent, when the user watches a short video (for example, called v1), the terminal downloads this short video, and the video player application may record the bandwidth information of the terminal. Before the user watches another short video (for example, called v2), the network of the terminal is idle, and the video player application cannot record the bandwidth information of the terminal. When the user watches v2, the bandwidth information for setting the code rate of v2 is the bandwidth information of the terminal when the user watches v1.

Since the bandwidth information on which the current multi-rate adaptive technology relies is the bandwidth information before a fixed time window at the current moment, in the case when the idle time of the network is long after the user watches v1 and before the user watches v2, the entire fixed time window is in a period during which the network is idle if the fixed time window is set to be relatively small, so that the historical bandwidth information cannot be obtained. If the time window is set to be relatively large, even though the bandwidth information of the terminal when the user is watching v1 can be obtained, the network situation is likely to have changed because the moment for the user to watch v1 is far away from the current moment. Then, the accuracy in determining the bandwidth information at the current moment according to the bandwidth information of the terminal when the user is watching v1 is relatively low, and thus it is difficult to accurately set the code rate according to the bandwidth.

Figure 1:
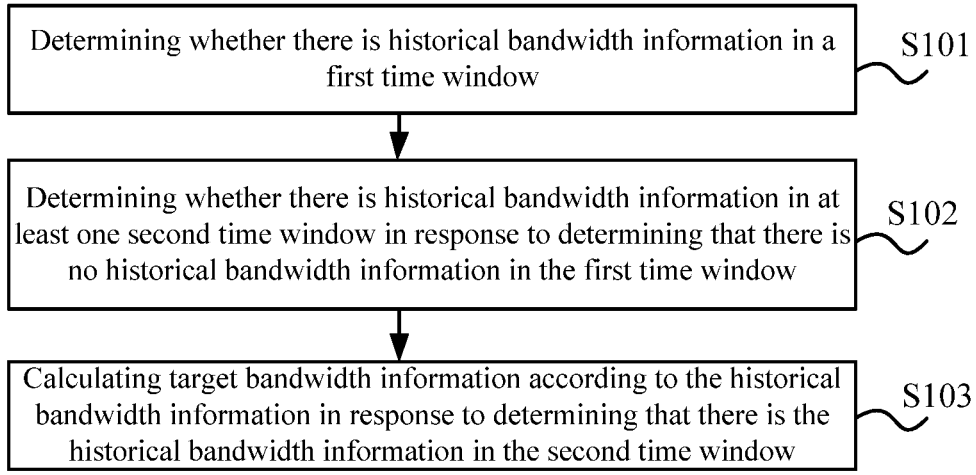
FIG. 1 is a schematic flowchart of a method for determining bandwidth according to an embodiment of the present disclosure.

FIG. 1 is a schematic flowchart of a method for determining bandwidth according to an embodiment of the present disclosure. The method for determining bandwidth shown in an embodiment of the present disclosure may be applicable to a video player application applicable to a terminal, including but not limited to: a mobile phone, a tablet computer, a wearable device, a personal computer, and other electronic devices. The video player application may be an application installed in the terminal, or a web application integrated in a browser. A user may play videos through the video player application, where the video player application may play a long video such as a movie, a TV show, etc., or may play a short video such as a video clip, a sitcom, etc.

As shown in FIG. 1, the method for determining bandwidth may include following steps.

Step S101: determining whether there is historical bandwidth information in a first time window, where the historical bandwidth information is bandwidth information when data is transmitted through a network in the first time window.

Step S102: determining whether there is historical bandwidth information in at least one second time window in response to determining that there is no historical bandwidth information in the first time window, where a time interval of the second time window includes a time interval of the first time window, and the time interval of the second window is larger than the time interval of the first time window.

Step S103: calculating target bandwidth information according to the historical bandwidth information in response to determining that there is the historical bandwidth information in the second time window.

In one embodiment, the video player application may download the played video from a server corresponding to the video during the process of downloading the video. This process needs to occupy the bandwidth of the terminal to download the video, so the bandwidth information (i.e., historical bandwidth information) of the terminal may be obtained, and the obtaining moment of the historical bandwidth information may be recorded. Of course, the video player application may also download the content other than the video, and may also obtain the historical bandwidth information in this process.

It should be noted that the actions of obtaining the historical bandwidth information and recording the obtaining moment of the historical bandwidth information may be performed periodically, that is, a plurality of pieces of bandwidth information may be obtained during the process of playing a video once.

Correspondingly, the number of pieces of the historical bandwidth information determined in a time window may also be one or more. For example, one piece of historical bandwidth information is determined, and then the determined historical bandwidth information may be taken as the target bandwidth information. For example, a plurality of pieces of historical bandwidth information is determined, and then the plurality of pieces of historical bandwidth information may be weighted and summed to obtain the target bandwidth information.

In one embodiment, the calculated target bandwidth information may be taken as the bandwidth information at a preset moment, where the end points of all time windows may be the same and are all the preset moment, and the preset moment may be the current moment or may be other future moment set as needed.

In an embodiment of the present disclosure, it may be determined whether there is historical bandwidth information in the first time window at first, and it may be further determined whether there is historical bandwidth information in at least one second time window in response to determining that there is no historical bandwidth information in the first time window. The time interval of each second time window includes the time interval of the first time window, and the time interval of each second window is larger than the time interval of the first time window.

That is to say, the start and end points of the first time window are both within the second time window. For example, each time window may have the same end point, which is for example the preset moment, so the end point of the second time window is the same as that of the first time window, and the start point of the second time window is just before the start point of the first time window. The time point in the smaller first time window is generally closer to the preset moment than the time point in the second window, so the historical bandwidth information determined in the first time window is more likely to be close to the bandwidth information at the preset moment.

In an embodiment of the present disclosure, the historical bandwidth information may be determined in the shorter first time window at first, the historical bandwidth information is determined in at least one longer second time window when no historical bandwidth information can be determined in the first time window, and the target bandwidth information is calculated based on the determined historical bandwidth information. Thus, if the historical bandwidth information has been determined in the shorter first time window, the historical bandwidth information is closer to the preset moment in the future, so the accuracy in determining the bandwidth information at the preset moment according to the historical bandwidth information can be ensured; if no historical bandwidth information is determined in the shorter first time window, the historical bandwidth information may be determined in the longer second time window, so as to determine the historical bandwidth information.

Figure 2:
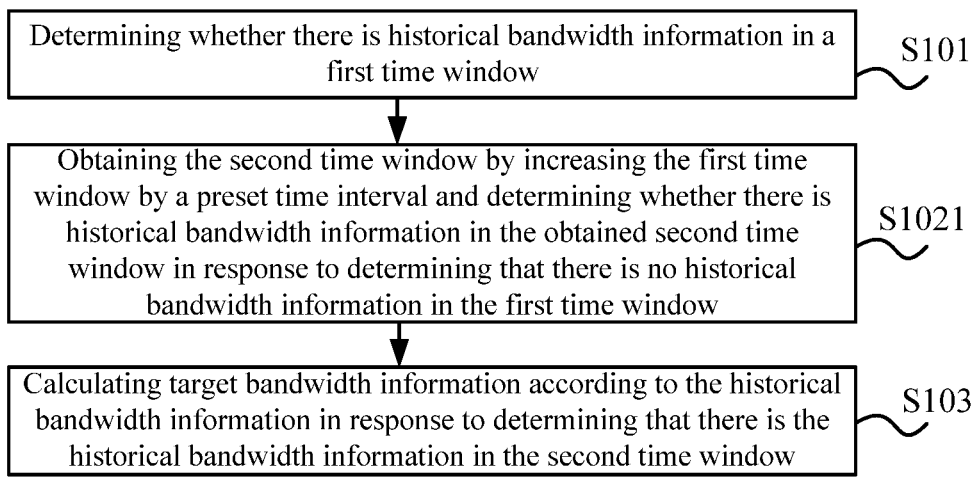
FIG. 2 is a schematic flowchart of another method for determining bandwidth according to an embodiment of the present disclosure.

FIG. 2 is a schematic flowchart of another method for determining bandwidth according to an embodiment of the present disclosure. As shown in FIG. 2, the step of determining whether there is historical bandwidth information in at least one second time window in response to determining that there is no historical bandwidth information in the first time window includes following steps.

Step S1021: obtaining the second time window by increasing the first time window by a preset time interval and determining whether there is historical bandwidth information in the obtained second time window in response to determining that there is no historical bandwidth information in the first time window.

In one embodiment, the first time window and the preset time interval may be set at first. For example, the end point of the first preset time window may be a preset moment. The way to increase the first time window by the preset time interval may be to increase from the start point of the first time window so that the end point of the obtained second time window is unchanged relative to the first time window and the start point of the obtained second time window is advanced relative to the first time window.

It should be noted that the step S1021 may be performed once or may be performed many times, which may be set as required. For example, the step S1021 is performed many times as an example. Then, when no historical bandwidth information is determined in the second time window obtained by increasing the first time window by the time interval, the second time window may be increased by the time interval in the way as increasing the first time window by the time interval.

And so on, until the historical bandwidth information is determined in the second time window after first time window is increased by the preset time interval for at least one time, or the first time window is increased by the preset time interval for a preset number of times.

In this way, the time window for determining the historical bandwidth information is gradually expanded, and it can be ensured that the determined historical bandwidth information is as close as possible to the preset moment, that is, the accuracy of determining the bandwidth information at the preset moment according to the historical bandwidth information is also ensured as possible.

Figure 3:
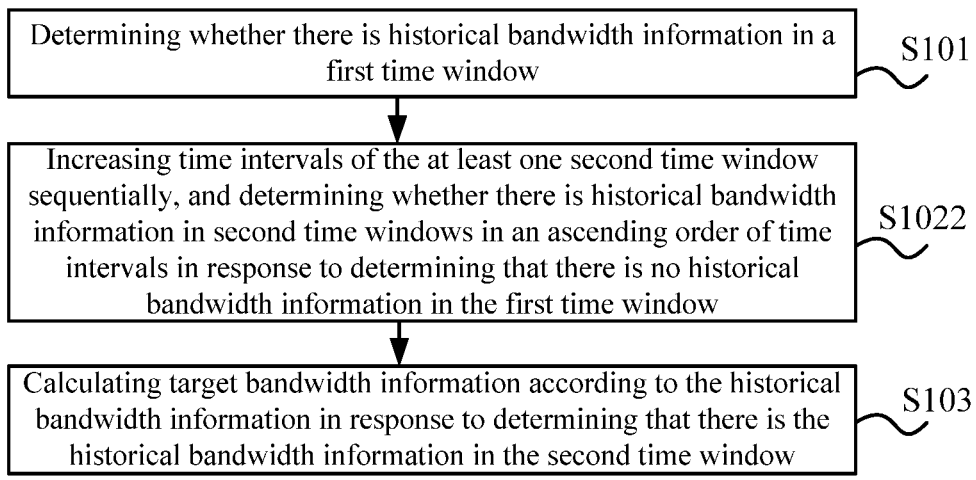
FIG. 3 is a schematic flowchart of yet another method for determining bandwidth according to an embodiment of the present disclosure.

FIG. 3 is a schematic flowchart of yet another method for determining bandwidth according to an embodiment of the present disclosure. As shown in FIG. 3, the step of determining whether there is historical bandwidth information in at least one second time window in response to determining that there is no historical bandwidth information in the first time window includes following steps.

Step S1022: increasing time intervals of the at least one second time window sequentially, and determining whether there is historical bandwidth information in second time windows in an ascending order of time intervals in response to determining that there is no historical bandwidth information in the first time window.

In an embodiment, n time windows $W_1$ to $W_n$ may be preset, where $n \geq 2$, $i \in n$, i and n are integers, and the time interval of the time window is larger than the time interval of the time window $W_i$. The process of increasing the time interval may be described in the following way: selecting the $i^{th}$ time window starting from i=1 (that is, the time window when i=1 is the first time window) among n time windows; determining whether the obtaining moment exists in the $i^{th}$ time window; if the obtaining moment does not exist in the $i^{th}$ time window, setting i to i+1, and determining whether the obtaining moment exists in the $i^{th}$ time window; this step is repeated until it is determined that the obtaining moment exists in the $i^{th}$ time window (that is, the time window when i>1 is the second time window, and the greater i, the larger the time interval of the corresponding second time window).

For example, the end points of n time windows $W_1$ to $W_n$ are the same and are all the preset moment, and n time windows may form a set $W=[W_1, W_2, \ldots, W_n]$, where the time interval of the time window $W_{i+1}$ is larger than the time interval of the time window $W_i$, that is, $W_1$ to $W_n$ are increasing, and the difference between $W_{i+1}$ and Wi may be a fixed value or not.

The $i^{th}$ time window may be selected starting from i=1 among these n time windows, and then it is determined whether the obtaining moment exists in the $i^{th}$ time window before the preset moment, starting from the preset moment. Since the time window selected when i=1 is $W_1$, $W_1$ is the smallest one of n time windows, and the historical bandwidth information obtained therein is relatively close to the bandwidth information at the preset moment.

In the case when there is no historical bandwidth information in the time window $W_1$, i may be set to i+1, and it is determined whether the obtaining moment exists in the time window $W_2$, that is, the time window is expanded, and it is determined whether there is historical bandwidth information in the expanded time window, that is, it is determined whether there is historical bandwidth information in $W_2$ that is longer than $W_1$.

In this way, the time window for determining the historical bandwidth information is gradually expanded, and it can be ensured that the determined historical bandwidth information is as close as possible to the preset moment, that is, the accuracy of determining the bandwidth information at the preset moment according to the historical bandwidth information is also ensured as possible.

In one embodiment, the action of recording the historical bandwidth information may be performed periodically, that is, a plurality of pieces of historical bandwidth information may be obtained in the process of playing a video once. For example, the plurality of pieces of historical bandwidth information is k pieces of historical bandwidth information $bw_1$ to $bw_k$. Then, the historical bandwidth information $bw_t$ at the preset moment t is a function of $bw_1$ to $bw_k$, and this function may be the weighted summation of $bw_1$ to $bw_k$, where the weight of each piece of bandwidth information may be set as required.

It should be noted that the above function may be adjusted as required, and is not limited to the weighted summation of $bw_1$ to $bw_k$.

Figure 4:
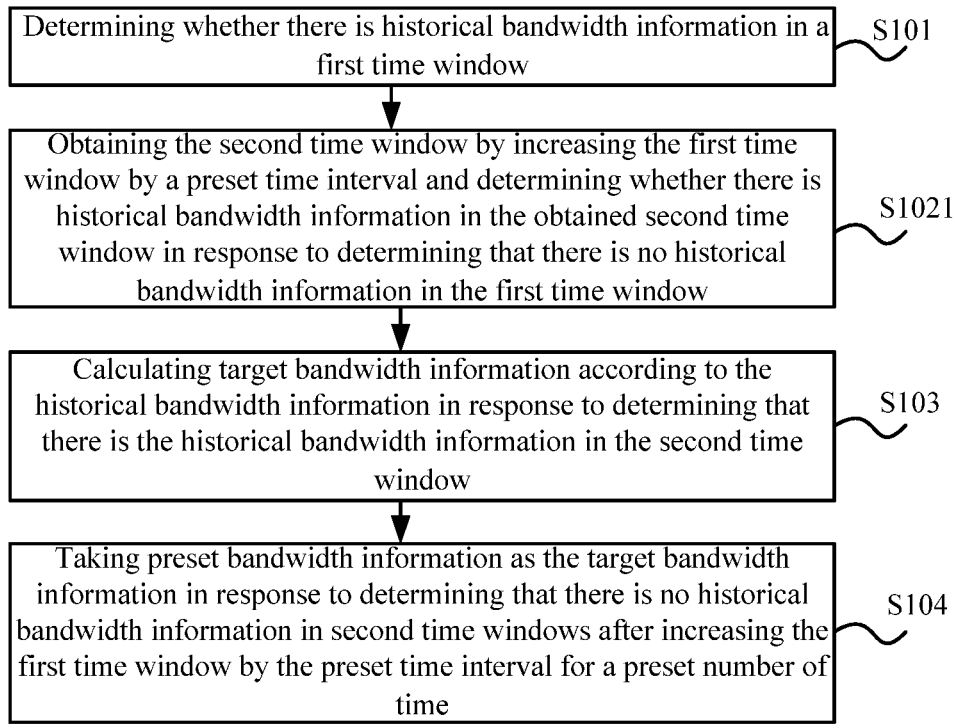
FIG. 4 is a schematic flowchart of yet another method for determining bandwidth according to an embodiment of the present disclosure.

FIG. 4 is a schematic flowchart of yet another method for determining bandwidth according to an embodiment of the present disclosure. As shown in FIG. 4, the method further includes following steps.

Step S104: taking preset bandwidth information as the target bandwidth information in response to determining that there is no historical bandwidth information in second time windows after increasing the first time window by the preset time interval for a preset number of times.

In one embodiment, in order to avoid the resource waste due to expanding the time window too many times, the preset number of times may be set. Then, if there is still no historical bandwidth information in the second time windows after increasing the first time window by the preset time interval for the preset number of times, there is no need to expand the time window again, and instead, the preset bandwidth information may be directly taken as the bandwidth information at the preset moment.

Figure 5:
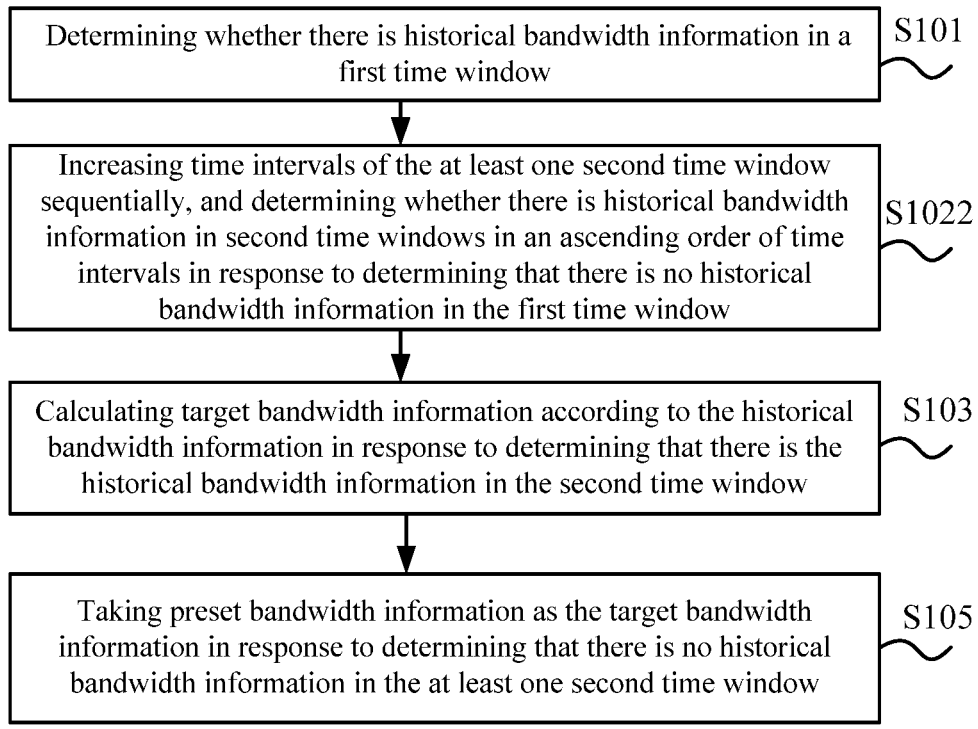
FIG. 5 is a schematic flowchart of yet another method for determining bandwidth according to an embodiment of the present disclosure.

FIG. 5 is a schematic flowchart of yet another method for determining bandwidth according to an embodiment of the present disclosure. As shown in FIG. 5, the method further includes following steps.

Step S105: taking preset bandwidth information as the target bandwidth information in response to determining that there is no historical bandwidth information in the at least one second time window.

In an embodiment, in response to determining that there is no historical bandwidth information in the at least one second time window, that is, there is no historical bandwidth information in each second time window, the preset bandwidth information may be selected as the target bandwidth information so that the target bandwidth information can be determined.

Figure 6:
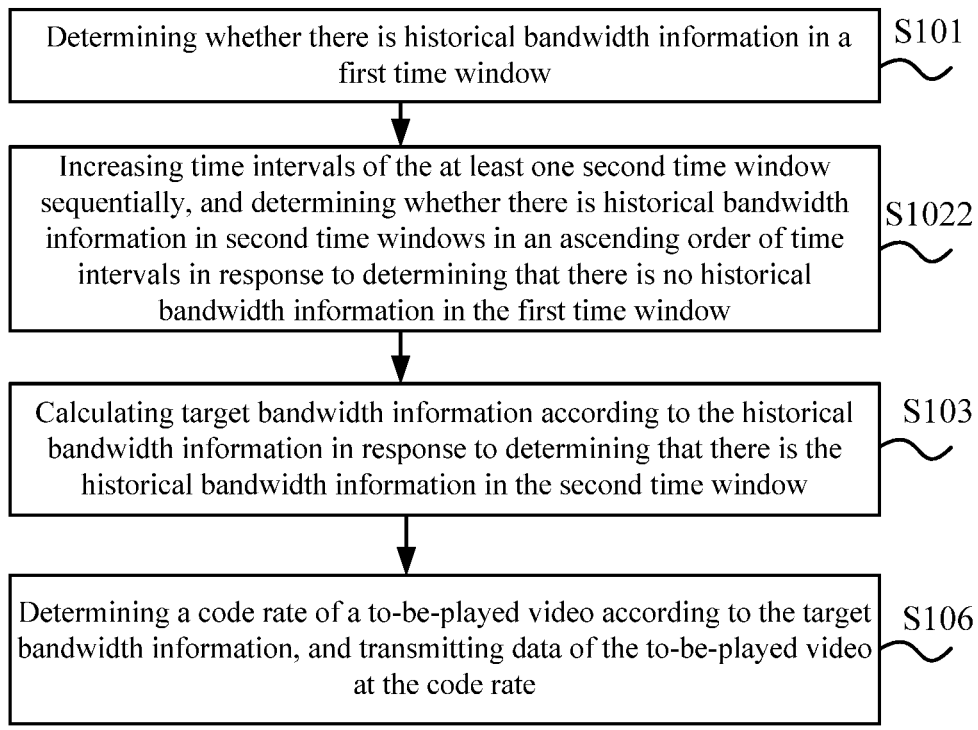
FIG. 6 is a schematic flowchart of yet another method for determining bandwidth according to an embodiment of the present disclosure.

FIG. 6 is a schematic flowchart of yet another method for determining bandwidth according to an embodiment of the present disclosure. As shown in FIG. 6, after calculating the target bandwidth information according to the historical bandwidth information, the method further includes following steps.

Step S106: determining a code rate of a to-be-played video according to the target bandwidth information, and transmitting data of the to-be-played video at the code rate.

In one embodiment, after the target bandwidth information is calculated, the code rate of the to-be-played video (for example, the code rate of the video played at the preset moment) may be further determined according to the target bandwidth information, where the code rate of the to-be-played video is $r=f(bw_t)$, and the function f(x) may be set as required.

If there is historical bandwidth information in a smaller time window, then the determined historical bandwidth information is the historical bandwidth information closest to the preset moment among the historical bandwidth information that can be obtained, so that the accuracy in determining the bandwidth information at the preset moment according to the historical bandwidth information can be ensured and thus the calculated code rate is also relatively accurate, and the bandwidth information of the terminal at the preset moment can be well adapted to.

If there is no historical bandwidth information in a smaller time window, the historical bandwidth information may be determined in a larger time window, so that the historical bandwidth information is determined to calculate the target bandwidth and further calculate the code rate.

Corresponding to the foregoing embodiments of the methods for determining bandwidth, the present disclosure further proposes embodiments of apparatuses for determining bandwidth.

Figure 7:
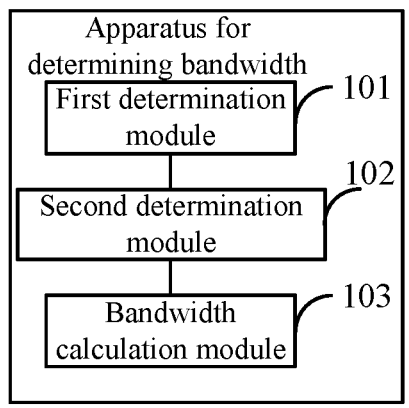
FIG. 7 is a schematic block diagram of an apparatus for determining bandwidth according to an embodiment of the present disclosure.

FIG. 7 is a schematic block diagram of an apparatus for determining bandwidth according to an embodiment of the present disclosure. The apparatus for determining bandwidth shown in an embodiment of the present disclosure may be applicable to a video player application applicable to a terminal, including but not limited to: a mobile phone, a tablet computer, a wearable device, a personal computer, and other electronic devices. The video player application may be an application installed in the terminal, or a web application integrated in a browser. A user may play videos through the video player application, where the video player application may play a long video such as a movie, a TV show, etc., or may play a short video such as a video clip, a sitcom, etc.

As shown in FIG. 7, the apparatus for determining bandwidth may include: a first determination module 101 configured to determine whether there is historical bandwidth information in a first time window, where the historical bandwidth information is bandwidth information when data is transmitted through a network in the first time window; a second determination module 102 configured to determine whether there is historical bandwidth information in at least one second time window in response to determining that there is no historical bandwidth information in the first time window, where a time interval of the second time window includes a time interval of the first time window, and the time interval of the second window is larger than the time interval of the first time window; a bandwidth calculation module 103 configured to calculate target bandwidth information according to the historical bandwidth information in response to determining that there is the historical bandwidth information in the second time window.

In a possible embodiment, the second determination module 102 is configured to obtain the second time window by increasing the first time window by a preset time interval and determine whether there is historical bandwidth information in the obtained second time window in response to determining that there is no historical bandwidth information in the first time window.

In a possible embodiment, the second determination module 102 is configured to increase time intervals of the at least one second time window sequentially, and determine whether there is historical bandwidth information in second time windows in an ascending order of time intervals in response to determining that there is no historical bandwidth information in the first time window.

Figure 8:
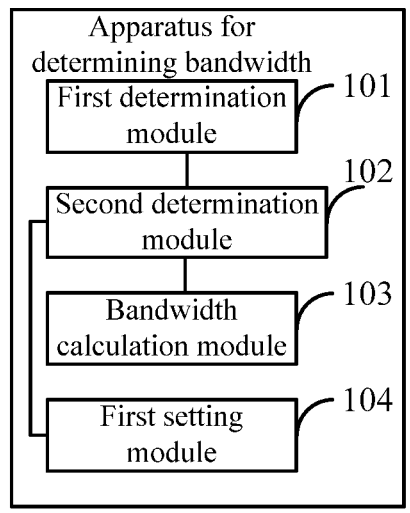
FIG. 8 is a schematic block diagram of another apparatus for determining bandwidth according to an embodiment of the present disclosure.

FIG. 8 is a schematic block diagram of another apparatus for determining bandwidth according to an embodiment of the present disclosure. As shown in FIG. 8, the apparatus further includes: a first setting module 104 configured to take preset bandwidth information as the target bandwidth information in response to determining that there is no historical bandwidth information in second time windows after increasing the first time window by the preset time interval for a preset number of times.

Figure 9:
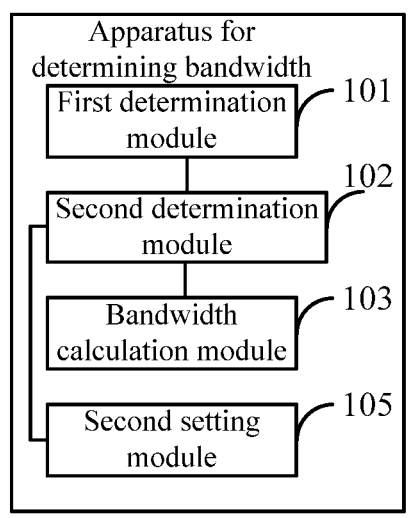
FIG. 9 is a schematic block diagram of yet another apparatus for determining bandwidth according to an embodiment of the present disclosure.

FIG. 9 is a schematic block diagram of yet another apparatus for determining bandwidth according to an embodiment of the present disclosure. As shown in FIG. 9, the apparatus further includes: a second setting module 105 configured to take preset bandwidth information as the target bandwidth information in response to determining that there is no historical bandwidth information in the at least one second time window.

Figure 10:
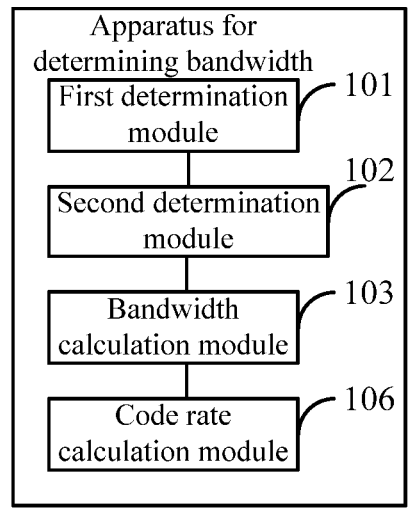
FIG. 10 is a schematic block diagram of yet another apparatus for determining bandwidth according to an embodiment of the present disclosure.

FIG. 10 is a schematic block diagram of yet another apparatus for determining bandwidth according to an embodiment of the present disclosure. As shown in FIG. 10, the apparatus further includes: a code rate calculation module 106 configured to determine a code rate of a to-be-played video according to the target bandwidth information, and transmit data of the to-be-played video at the code rate.

Regarding the apparatus in the above embodiment, the specific manner in which each module performs the operations has been described in detail in embodiments related to the method, and will not be illustrated in detail here.

An embodiment of the present disclosure further provides an electronic device, including: a processor; a memory for storing instructions executable by the processor; where the processor is configured to execute the instructions to implement the method for determining bandwidth described in any one of the foregoing embodiments.

An embodiment of the present disclosure further provides a storage medium. When instructions in the storage medium are executed by a processor of an electronic device, the electronic device can perform the method for determining bandwidth described in any one of the foregoing embodiments.

An embodiment of the present disclosure further provides a computer program product, where the computer program product is configured to, when invoked by a computer for execution, cause the computer to perform the method for determining bandwidth described in any one of the foregoing embodiments.

Optionally, the storage medium may be a non-transitory computer readable storage medium. For example, the non-transitory computer readable storage medium may be Read Only Memory (ROM), Random Access Memory (RAM), Compact Disk Read Only Memory (CD-ROM), magnetic tape, floppy disk, optical data storage device, etc.

An embodiment of the present disclosure further provides a computer program product configured to perform the method for determining bandwidth described in any one of the foregoing embodiments.

Figure 11:
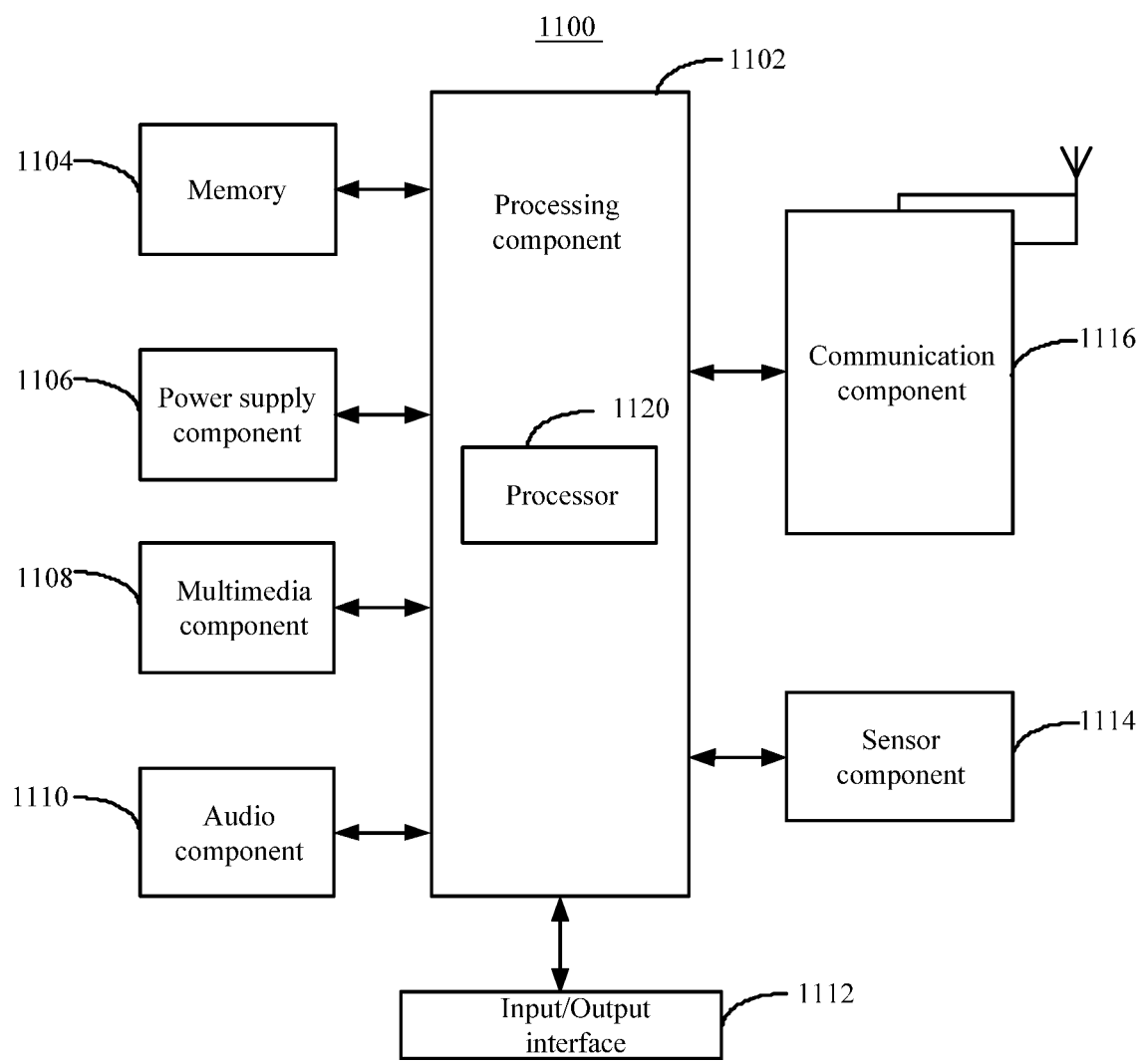
FIG. 11 is a schematic block diagram of an electronic device according to an embodiment of the present disclosure.

FIG. 11 is a schematic block diagram of an electronic device according to an embodiment of the present disclosure. For example, the electronic device 1100 may be a mobile phone, a computer, a digital broadcasting terminal, a message transceiver, a game console, a tablet device, a medical device, a fitness device, a personal digital assistant, or the like.

Referring to FIG. 11, the electronic device 1100 may include one or more of a processing component 1102, a memory 1104, a power supply component 1106, a multimedia component 1108, an audio component 1110, an Input/Output (I/O) interface 1112, a sensor component 1114, and a communication component 1116.

The processing component 1102 generally controls overall operations of the electronic device 1100, such as operations associated with display, phone call, data communication, camera operation, and recording operation. The processing component 1102 may include one or more processors 1120 to execute instructions to complete all or a part of the steps of the above method for determining bandwidth. In addition, the processing component 1102 may include one or more modules to facilitate the interactions between the processing component 1102 and other components. For example, the processing component 1102 may include a multimedia module to facilitate the interactions between the multimedia component 1108 and the processing component 1102.

The memory 1104 is configured to store various types of data to support the operations in the electronic device 1100. Examples of the data include instructions of any application program or method operated on the electronic device 1100, contact person data, phone book data, messages, pictures, videos, etc. The memory 1104 may be implemented by any type of volatile or nonvolatile storage device or a combination thereof, such as Static Random-Access Memory (SRAM), Electrically-Erasable Programmable Read-Only Memory (EEPROM), Erasable Programmable Read-Only Memory (EPROM), Programmable Read Only Memory (PROM), ROM, magnetic memory, flash memory, magnetic disk or optical disk.

The power supply component 1106 provides power for various components of the electronic device 1100. The power supply component 1106 may include a power management system, one or more power supplies, and other components associated with generating, managing and distributing the power for the electronic device 1100.

The multimedia component 1108 includes a screen that provides an output interface between the electronic device 1100 and the user. In some embodiments, the screen may include a Liquid Crystal Display (LCD) and a Touch Panel (TP). If the screen includes a touch panel, the screen may be implemented as a touch screen to receive input signals from the user. The touch panel includes one or more touch sensors to sense the touching, the sliding, and the gestures on the touch panel. The touch sensor may not only sense the boundary of the touching or sliding operation, but also detect the duration and pressure related to the touching or sliding operation. In some embodiments, the multimedia component 1108 includes a front camera and/or a rear camera. When the electronic device 1100 is in the operation mode such as shooting mode or video mode, the front camera and/or the rear camera may receive the external multimedia data. Each of the front camera and rear camera may be a fixed optical lens system or have the focal length and the optical zoom capability.

The audio component 1110 is configured to output and/or input audio signals. For example, the audio component 1110 includes a Microphone (MIC). When the electronic device 1100 is in the operation mode such as call mode, recording mode and voice recognition mode, the microphone is configured to receive the external audio signals. The received audio signals may be further stored in the memory 1104 or transmitted via the communication component 1116. In some embodiments, the audio component 1110 further includes a speaker for outputting the audio signals.

The I/O interface 1112 provides an interface between the processing component 1102 and a peripheral interface module, where the above peripheral interface module may be a keyboard, a click wheel, buttons or the like. These buttons may include but not limited to: home button, volume button, start button, and lock button.

The sensor component 1114 includes one or more sensors for providing the electronic device 1100 with the state assessments in various aspects. For example, the sensor component 1114 may detect the opening/closing state of the device 1100, and the relative positioning of the components (for example, the display and keypad of the electronic device 1100). The sensor component 1114 may further detect the position change of the electronic device 1100 or a component of the electronic device 1100, the presence or absence of contact of the user with the electronic device 1100, the orientation or acceleration/deceleration of the electronic device 1100, and the temperature change of the electronic device 1100. The sensor component 1114 may include a proximity sensor configured to detect the presence of nearby objects with no physical contact. The sensor component 1114 may further include a light sensor, such as Complementary Metal-Oxide Semiconductor (CMOS) or Charge Coupled Device (CCD), for use in the imaging applications. In some embodiments, the sensor component 1114 may further include an acceleration sensor, a gyro sensor, a magnetic sensor, a pressure sensor, or a temperature sensor.

The communication component 1116 is configured to facilitate the wired or wireless communications between the electronic device 1100 and other devices. The electronic device 1100 may access a wireless network based on a communication standard, such as Wireless-Fidelity (WiFi), operator network (e.g., 2G, 3G, 4G or 5G), or a combination thereof. In an exemplary embodiment, the communication component 1116 receives the broadcast signal or broadcast related information from an external broadcast management system via a broadcast channel. In an exemplary embodiment, the communication component 1116 further includes a Near Field Communication (NFC) module to facilitate the short-range communications. For example, the NFC module may be implemented based on the Radio Frequency Identification (RFID) technology, Infrared Data Association (IrDA) technology, Ultra Wide Band (UWB) technology, Bluetooth (BT) technology and other technologies.

In an embodiment of the present disclosure, the electronic device 1100 may be implemented by one or more Application Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors or other electronic elements to perform the above method for determining bandwidth.

In an embodiment of the present disclosure, there is also provided a non-transitory computer readable storage medium including instructions, for example, the memory 1104 include instructions, where the above instructions can be executed by the processor 1120 of the electronic device 1100 to complete the above method for determining bandwidth. For example, the non-transitory computer readable storage medium may be ROM, RAM, CD-ROM, magnetic tape, floppy disk, optical data storage device, etc.

After considering the specification and practicing the disclosure herein, those skilled in the art may readily come up with other embodiments. The disclosure is intended to encompass any variations, usages or applicability changes of the disclosure, and these variations, usages or applicability changes follow the general principle of the disclosure and include the common knowledge or customary technological means in the technical field which is not disclosed in the disclosure. The specification and embodiments are illustrative only, and the true scope and spirit of the disclosure is pointed out by the following claims.

It should be understood that the disclosure is not limited to the precise structures which have been described above and shown in the figures, and can be modified and changed without departing from the scope of the disclosure. The scope of the disclosure is only limited by the attached claims.

It should be noted that the relational terms such as first and second herein are only used to distinguish one entity or operation from another and do not necessarily require or imply any such actual relationship or sequence between these entities or operations. The term "include", "contain" or any other variant is intended to encompass the non-exclusive inclusion, so that the process, method, object or equipment including a series of elements not only includes those elements, but also includes other elements which are not listed clearly or includes the elements inherent in such process, method, object or equipment. Without more restrictions, the element defined by the sentence "include a . . . " does not preclude the existence of another identical element in the process, method, object or equipment including the element.

The methods and apparatuses provided by embodiments of the present disclosure are described in detail above, specific examples are used herein to illustrate the principles and embodiments of the present disclosure, and the description of the above embodiments is only used to help the understanding of the methods of the present disclosure and the core ideas thereof; and at the same time, those ordinary skilled in the art may make modifications on the specific embodiments and the application scope according to the ideas of the present disclosure. In summary, the content of this specification should not be construed as a limitation on the present disclosure.

What is claimed is:

1. A method for determining bandwidth, applicable to a video player application, the video player application being applicable to a terminal, and the method comprising:
determining whether there is historical bandwidth information in a first time window, wherein the historical bandwidth information is bandwidth information when data is transmitted through a network in the first time window;
determining whether there is historical bandwidth information in at least one second time window in response to determining that there is no historical bandwidth information in the first time window, the historical bandwidth information being one or more pieces of information, wherein a time interval of the second time window comprises a time interval of the first time window, and the time interval of the second window is larger than the time interval of the first time window;
calculating target bandwidth information according to the historical bandwidth information in response to determining that there is the historical bandwidth information in the second time window;
wherein said determining whether there is historical bandwidth information in at least one second time window in response to determining that there is no historical bandwidth information in the first time window, comprises:
obtaining the second time window by increasing the first time window by a preset time interval each time, and determining whether there is historical bandwidth information in the obtained second time window after each time the first time window is increased by the preset time interval until the first time window is increased by the preset time interval for a preset number of times or there is historical bandwidth information in the second time window obtained by increasing the first time window by the preset time interval for at least one time, in response to determining that there is no historical bandwidth information in the first time window; or
increasing time intervals of the at least one second time window sequentially, an end point of each second time window being identical to an end point of the first time window, and determining whether there is historical bandwidth information in second time windows in an ascending order of time intervals in response to determining that there is no historical bandwidth information in the first time window.

2. The method according to claim 1, further comprising:
taking preset bandwidth information as the target bandwidth information in response to determining that there is no historical bandwidth information in second time windows after increasing the first time window by the preset time interval for the preset number of times.

3. The method according to claim 1, further comprising:
taking preset bandwidth information as the target bandwidth information in response to determining that there is no historical bandwidth information in the at least one second time window.

4. The method according to claim 1, wherein the method further comprises:
determining a code rate of a to-be-played video according to the target bandwidth information, and transmitting data of the to-be-played video at the code rate.

5. An electronic device, comprising:
a processor;
a memory for storing instructions executable by the processor;
wherein the processor is configured to execute the instructions to:
determine whether there is historical bandwidth information in a first time window, wherein the historical bandwidth information is bandwidth information when data is transmitted through a network in the first time window;
determine whether there is historical bandwidth information in at least one second time window in response to determining that there is no historical bandwidth information in the first time window, the historical bandwidth information being one or more pieces of information, wherein a time interval of the second time window comprises a time interval of the first time window, and the time interval of the second window is larger than the time interval of the first time window;
calculate target bandwidth information according to the historical bandwidth information in response to determining that there is the historical bandwidth information in the second time window;
wherein the processor is configured to:
obtain the second time window by increasing the first time window by a preset time interval each time, and determine whether there is historical bandwidth information in the obtained second time window after each time the first time window is increased by the preset time interval until the first time window is increased by the preset time interval for a preset number of times or there is historical bandwidth information in the second time window obtained by increasing the first time window by the preset time interval for at least one time, in response to determining that there is no historical bandwidth information in the first time window; or
increase time intervals of the at least one second time window sequentially, an end point of each second time window being identical to an end point of the first time window, and determine whether there is historical bandwidth information in second time windows in an ascending order of time intervals in response to determining that there is no historical bandwidth information in the first time window.

6. The electronic device according to claim 5, wherein the processor is further configured to:
take preset bandwidth information as the target bandwidth information in response to determining that there is no historical bandwidth information in second time windows after increasing the first time window by the preset time interval for the preset number of times.

7. The electronic device according to claim 5, wherein the processor is further configured to:
take preset bandwidth information as the target bandwidth information in response to determining that there is no historical bandwidth information in the at least one second time window.

8. The electronic device according to claim 5, wherein the processor is further configured to:
determine a code rate of a to-be-played video according to the target bandwidth information and transmit data of the to-be-played video at the code rate after calculating the target bandwidth information according to the historical bandwidth information.

9. A non-transitory storage medium, wherein instructions in the storage medium, when executed by a processor of an electronic device, enable the electronic device to perform operations, the operations comprising:
- determining whether there is historical bandwidth information in a first time window, wherein the historical bandwidth information is bandwidth information when data is transmitted through a network in the first time window;
- determining whether there is historical bandwidth information in at least one second time window in response to determining that there is no historical bandwidth information in the first time window, the historical bandwidth information being one or more pieces of information, wherein a time interval of the second time window comprises a time interval of the first time window, and the time interval of the second window is larger than the time interval of the first time window;
- calculating target bandwidth information according to the historical bandwidth information in response to determining that there is the historical bandwidth information in the second time window;
- wherein said determining whether there is historical bandwidth information in at least one second time window in response to determining that there is no historical bandwidth information in the first time window, comprises:
- obtaining the second time window by increasing the first time window by a preset time interval each time, and determining whether there is historical bandwidth information in the obtained second time window after each time the first time window is increased by the preset time interval until the first time window is increased by the preset time interval for a preset number of times or there is historical bandwidth information in the second time window obtained by increasing the first time window by the preset time interval for at least one time, in response to determining that there is no historical bandwidth information in the first time window; or
- increasing time intervals of the at least one second time window sequentially, an end point of each second time window being identical to an end point of the first time window, and determining whether there is historical bandwidth information in second time windows in an ascending order of time intervals in response to determining that there is no historical bandwidth information in the first time window.

10. The non-transitory storage medium according to claim 9, the operations further comprising:
- taking preset bandwidth information as the target bandwidth information in response to determining that there is no historical bandwidth information in second time windows after increasing the first time window by the preset time interval for the preset number of times.

11. The non-transitory storage medium according to claim 9, the operations further comprising:
- taking preset bandwidth information as the target bandwidth information in response to determining that there is no historical bandwidth information in the at least one second time window.

12. The non-transitory storage medium according to claim 9, the operations further comprising:
- determining a code rate of a to-be-played video according to the target bandwidth information, and transmitting data of the to-be-played video at the code rate.

* * * * *